United States Patent

Feistel et al.

(10) Patent No.: US 6,727,463 B2
(45) Date of Patent: Apr. 27, 2004

(54) ARRANGEMENT FOR THE WORKING OF THREE-DIMENSIONAL, EXPANDABLE UPPER SURFACES OF WORK PIECES BY MEANS OF A LASER

(75) Inventors: Ulf Feistel, Laasdorf (DE); Frank Schmieder, Buergel (DE); Norbert Preuss, Jena (DE)

(73) Assignee: Jenoptik Automatisierungstechnik GmbH, Jena (DE)

(*) Notice: Subject to any disclaimer, the term of this patent is extended or adjusted under 35 U.S.C. 154(b) by 0 days.

(21) Appl. No.: 10/357,174

(22) Filed: Feb. 3, 2003

(65) Prior Publication Data

US 2003/0146198 A1 Aug. 7, 2003

(30) Foreign Application Priority Data

Feb. 5, 2002 (DE) .......................... 102 04 993

(51) Int. Cl.[7] .............................................. B23K 26/08
(52) U.S. Cl. ................................................ 219/121.78
(58) Field of Search ................. 219/121.78, 121.79, 219/121.8, 121.81, 121.67, 121.68, 121.69; 359/861, 862; 901/8

(56) References Cited

U.S. PATENT DOCUMENTS

| | | | | | |
|---|---|---|---|---|---|
| 4,539,462 | A | * | 9/1985 | Plankenhorn | 219/121.79 |
| 4,638,143 | A | * | 1/1987 | Akeel | 219/121.74 |
| 4,812,613 | A | * | 3/1989 | Gorisch | 219/121.74 |

FOREIGN PATENT DOCUMENTS

| | | |
|---|---|---|
| DE | 44 13 159 | 6/1995 |
| DE | 198 21 211 | 11/1998 |

* cited by examiner

*Primary Examiner*—Kiley Stoner
*Assistant Examiner*—Jonathan Johnson
(74) *Attorney, Agent, or Firm*—Reed Smith LLP

(57) ABSTRACT

An arrangement for machining workpieces by a laser, particularly for cutting, perforating, notching, engraving, drilling and inscribing workpieces with three-dimensional structures of different sizes. The laser beam is directed to the workpiece, which is fixed on a holding device, by means of a robot-guided articulated mirror arm and a laser scanner. The laser beam is guided by a coordinated time-controlled and position-controlled deflection of the articulated mirror arm and of the mirror elements of the laser scanner.

5 Claims, 1 Drawing Sheet

Figure 1:
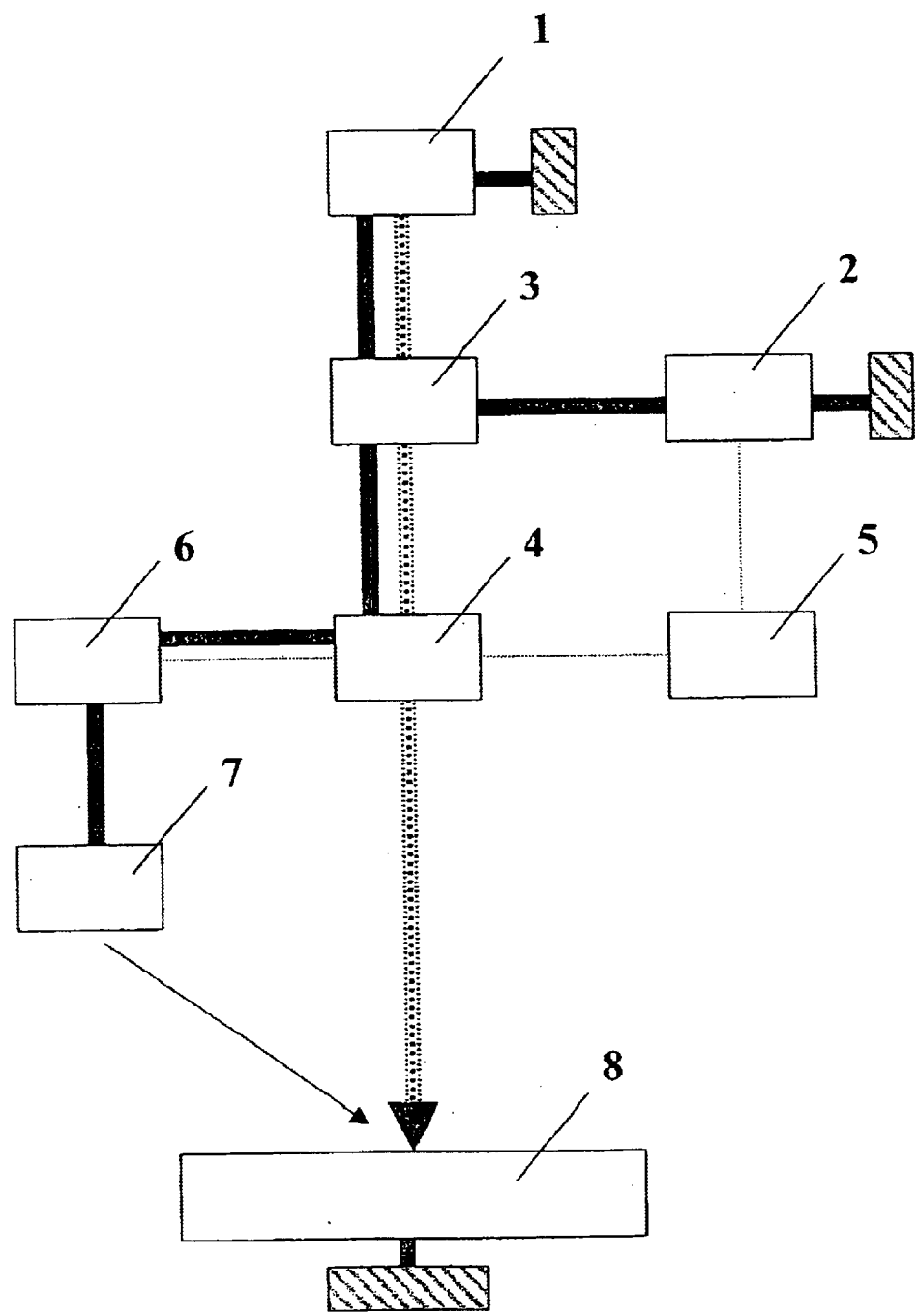

ARRANGEMENT FOR THE WORKING OF THREE-DIMENSIONAL, EXPANDABLE UPPER SURFACES OF WORK PIECES BY MEANS OF A LASER

CROSS-REFERENCE TO RELATED APPLICATIONS

This application claims priority of German Application No. 102 04 993.9, filed Feb. 5, 2002, the complete disclosure of which is hereby incorporated by reference.

BACKGROUND OF THE INVENTION a) Field of the Invention

The invention is directed to an arrangement for machining workpieces by means of a laser, particularly for cutting, perforating, notching, engraving, drilling and inscribing workpieces with three-dimensional structures of different sizes. It can also be used advantageously for removing layers from such workpieces.

b) Description of the Prior Art

Arrangements for machining a workpiece by means of a laser basically comprise a laser, a device for guiding the laser beam to the workpiece and a device for holding the workpiece. For processes in which a relative movement (forward feed) must be carried out between the laser beam, as tool, and the workpiece (e.g., cutting, perforating, ablating), this relative movement is usually realized by the device for guiding the laser beam, while the workpiece is held so as to be stationary.

Various basic principles are known for such devices for guiding the laser beam to the stationary workpiece surface.

For machining of large-area workpieces in particular, arrangements are known in which a laser head focusing the laser beam can be moved freely in a parallel to the workpiece surface by means of an overhead gantry or frame. The laser beam travels from the laser to the laser head by way of an articulated mirror arm. This is advantageous in that, when suitably dimensioned, a frame of this kind can guide the laser beam also over very large workpiece surfaces. Its disadvantages consists in a large space requirement, limited machining speed, particularly when the machining direction is changed often, and the fact that it is applicable exclusively on plane workpiece surfaces.

Arrangements in which a laser head is arranged at a robot arm which is freely movable in three dimensions are also known for machining large workpiece surfaces. In this case also, the laser beam, is guided to the laser head by an articulated mirror arm. The size of the workpiece surface to be machined is limited only by the free space for the movement of the robot arm and mirror articulation arm. The inertia of the mechanics of the robot arm and of the articulated mirror arm also allow only a limited machining speed.

In both solutions, it is known to arrange at the laser head a gas nozzle through which a flow of gas is directed to the surface to be machined in order to prevent flames which lead to unwanted soot deposits and to prevent depositing of melted material. Since the laser radiation exits the laser head in a fixedly defined direction and is guided over the workpiece surface at a defined distance, the gas nozzle is mounted on the laser head at a fixed angle to the laser beam such that the laser beam and the gas jet exiting from the gas nozzle are always directed to the same point on the workpiece surface.

It is known to use optical beam deflecting units, also known as laser scanners, for machining small, plane surfaces. The beam is guided by the tilting of mirrors. This is advantageous because of the high speed that can be achieved and due to the accurate precision of the beam deflection. It is disadvantageous that the laser beam can only sweep over a small spatial area. A combination of such arrangements with a gas feed to the machining location is not known.

Therefore, the only solutions used in the prior art for arrangements in which workpieces with large surfaces extending in three dimensions are to be machined are those in which the laser beam is guided along the desired machining line on the workpiece surface by means of an articulated mirror arm fastened to a robot arm.

OBJECT AND SUMMARY OF THE INVENTION

It is the primary object of the invention to provide an arrangement for machining workpiece surfaces extending in three dimensions in which a flow of gas is directed to the machining location and which permits a faster machining speed compared to conventional arrangements independent of the extent and shape of the machining line.

This object is met for an arrangement according to the invention, the arrangement being for machining workpiece surfaces extending in three dimensions by a laser comprising a stationary laser, an articulated mirror arm, a robot arm connected to a robot for guiding the second end of the articulated mirror arm, a holding device for fixing a workpiece, at least one gas nozzle by which a flow of gas is directed to the workpiece surface and a control device for controlling the robot arm, and in that a laser scanner is fastened to the robot arm and is connected to the articulated mirror arm in such a way that the beam exiting from the second end of the articulated mirror arm is coupled into the laser scanner and the gas nozzles are arranged at the laser scanner so as to be movable in such a way that they can be oriented to the workpiece surface by a gas nozzle propulsion communicating with the control device, so that the gas flow and the radiation exiting from the laser scanner via an exit face coincide at a point on the workpiece surface.

The invention will be described more fully in the following in an embodiment example with reference to a drawing.

BRIEF DESCRIPTION OF A DRAWING

FIG. 1 shows a schematic view of a construction of an arrangement.

DESCRIPTION OF THE PREFERRED EMBODIMENTS

The arrangement shown in FIG. 1 essentially comprises a laser 1 which is mounted in a stationary manner, a robot arm 2 which is fastened to a robot shown in the drawing only as a fixed bearing, an articulated mirror arm 3, a laser scanner 4, a control device 5, a gas nozzle propulsion unit 6, at least one gas nozzle 7, and a holding device 8.

With respect to the connections between the devices, the thick solid lines represent mechanical connections, the thin dotted lines show signal connections, and the thick lines with multiple dots represent optical connections.

The stationary laser 1 is mechanically and optically connected to the first end of the articulated mirror arm 3, the second end of the articulated mirror arm 3 being fixedly connected to the free end of the robot arm 2. The second end of the articulated mirror arm 3 through which the beam coupled in by the laser 1 exits the articulated mirror arm 3 is accordingly freely movable in three dimensions. The laser scanner 4 which is fixedly coupled to the second end of the articulated mirror arm 3 optically and mechanically on the input side is likewise arranged at the free end of the robot arm 2. The gas nozzle propulsion unit 6 and at least one gas nozzle 7 are fastened to the laser scanner 4. A signal line provides a control connection from the laser 1, the robot arm 2, the laser scanner 4 and the gas nozzle propulsion unit 6 to the control device 5.

The radiation emitted from the laser 1 is coupled into the first end of the articulated mirror arm 3 and exits the articulated mirror arm (3) by the second end at a point within the space above a workpiece fixed to the holding device (8), which point is determined by the spatial position of the free end of the robot arm (2). Upon exiting the articulated mirror arm (3), the radiation is coupled into the laser scanner (4), where the beam can be deflected by the mirror elements around the above-mentioned point in two or three spatial directions. The beam is guided in the desired manner for machining the workpiece by means of a coordinated control of the spatial position and speed of the articulated mirror arm 3 and mirror elements of the laser scanner 4. The position of the beam when striking the workpiece surface is accordingly determined by a coordinated superposition of the beam control in the articulated mirror arm (3) and in the laser scanner (4). The person skilled in the art is familiar with the particulars of beam control in an articulated mirror arm (3) and laser scanner (4). The gas nozzle 7 is movably arranged at the laser scanner 4 and follows the laser beam by means of the gas nozzle propulsion unit 6, so that the direction of the gas flow intersects with the laser beam on the workpiece surface in the respective machining location. A plurality of gas nozzles 7 are advantageously arranged about the exit face of the laser beam at the laser scanner 4. In a conventional laser scanner 4 in a square arrangement around the exit face, for example, the gas nozzles 7 can be arranged at each of the four corners of the laser scanner. More than four nozzles can also be arranged in a ring shape around the exit face.

The inventive combination of an articulated mirror arm 3 and a laser scanner 4 with a gas nozzle propulsion unit 6 and gas nozzles 7 makes it possible, by coordinated simultaneous or alternate control, to guide the laser beam and gas flow to the machining location in an optimal manner depending on the size and shape of the workpiece and depending on the size and contour of the machining surface (e.g., for ablating) or machining line (e.g., for cutting or perforating).

The uniformity with which the gas flow strikes the machining location increases as the number of gas nozzles 7 arranged about the exit face in a centrally distributed manner increases.

In principle, an arrangement according to the invention can be operated in three machining modes:

1. The robot arm 2 moves the laser scanner 4 to a first machining position and remains stationary during machining. The machining surface or machining line is machined only by controlling or deflecting the mirrors in the laser scanner 4. The gas nozzles 7 are deflected by the gas nozzle propulsion unit 6 in such a way that the gas flow is directed to the machining location, i.e., to the precise point on which the laser beam also impinges. The robot arm 2 subsequently moves the laser scanner 4 to a second machining position, where the machining process is repeated (stop-and-go operation). During machining, the beam is guided on the workpiece surface exclusively by means of the laser scanner 4. An operation of this kind is advantageous for cutting hole contours, for example.

2. The laser scanner 4 is moved over the workpiece surface continuously by the robot arm 2 and, in addition, the laser scanner 4 deflects the beam in one, two or three directions (flying motion operation). During the machining, the beam is accordingly guided by a coordinated time-controlled and position-controlled deflection of the articulated mirror arm 3 and mirror elements of the laser scanner 4. The spatial guidance (machining contour) and timed guidance (machining speed) of the laser beam moved by the laser scanner 4 is controlled in accordance with the movement speed of the robot arm 2 which guides the articulated mirror arm 3. This machining mode is particularly suitable for longer non-straight machining lines, e.g., a sinusoidal line.

3. The robot arm 2 is guided over the workpiece surface continuously and the laser scanner 4 keeps the beam stationary (motionless operation). The beam is guided exclusively by means of the robot arm 2. This mode is provided particularly for machining very long, large contours.

Circles with a diameter of 10 mm, for example, can be produced at a speed of 10 ms with an arrangement according to the invention compared to a speed of 1 s with an arrangement having only one robot arm for guiding the beam. Rectangles measuring 10 mm ×10 mm can be machined in 40 ms instead of 1.3 s.

While the foregoing description and drawings represent the present invention, it will be obvious to those skilled in the art that various changes may be made therein without departing from the true spirit and scope of the present invention.

REFERENCE NUMBERS

1 laser
2 robot arm
3 articulated mirror arm
4 laser scanner
5 control device
6 gas nozzle propulsion unit
7 gas nozzles
8 holding device

What is claimed is:

1. An arrangement for machining workpiece surfaces extending in three dimensions by a laser, comprising:

a stationary laser;

an articulated mirror arm, radiation of the laser being coupled into a first end of the articulated mirror arm;

a robot arm connected to a robot for guiding the second end of a articulated mirror arm;

a holding device for fixing a workpiece;

at least one gas nozzle by which a flow of gas is directed to the workpiece surface;

a control device for controlling the laser and robot arm;

a laser scanner being fastened to the robot arm and connected to the articulated mirror arm in such a way that the beam exiting from the second end of the articulated mirror arm is coupled into the laser scanner;

said gas nozzles being arranged at the laser scanner so as to be movable in such a way that they can be directed to the workpiece surface by a gas nozzle propulsion unit communicating with the control device;

wherein gas flow and the radiation exiting from the laser scanner via an exit face coincide at a point on the workpiece surface.

2. The arrangement for machining workpiece surfaces extending in three dimensions by means of a laser according to claim 1, wherein the gas nozzles are arranged around the exit surface centric to the latter.

3. The arrangement for machining workpiece surfaces extending in three dimensions by means of a laser according to claim 2, wherein the gas nozzles are arranged in a ring-shaped manner.

4. The arrangement for machining workpiece surfaces extending in three dimensions by means of a laser according to claim 2, wherein a gas nozzle is arranged at each corner of a laser scanner that is constructed in a square arrangement around the exit face.

5. The arrangement for machining workpiece surfaces extending in three dimensions by a laser according to claim 1, wherein the machining contour and the machining speed of the laser beam moved by the laser scanner is controlled corresponding to the movement speed of the robot arm.

* * * * *